United States Patent [19]

Sato et al.

[11] Patent Number: 5,686,131
[45] Date of Patent: Nov. 11, 1997

[54] EDIBLE OIL OR FAT AND EDIBLE OIL OR FAT MIXTURE

[75] Inventors: Norifumi Sato, Kawagoe; Yuzi Murakami, Tokorozawa; Tadashi Idota; Hiroaki Konishi, both of Kawagoe; Kiyoshi Tatsumi, Iruma; Mototake Murakami, Sayama, all of Japan

[73] Assignee: Snow Brand Milk Products Co., Ltd., Sapporo, Japan

[21] Appl. No.: 443,993

[22] Filed: May 18, 1995

[30] Foreign Application Priority Data

May 18, 1994 [JP] Japan .................. 6-103596

[51] Int. Cl.⁶ .................................. A23D 7/00
[52] U.S. Cl. .......................... 426/601; 426/606
[58] Field of Search .................... 426/601, 606

[56] References Cited

U.S. PATENT DOCUMENTS

| | | | |
|---|---|---|---|
| 3,758,530 | 9/1973 | Barsky | 260/410.7 |
| 3,852,315 | 12/1974 | De Groot | 260/410.7 |
| 3,855,254 | 12/1974 | Haighton | 260/410.7 |
| 3,856,703 | 12/1974 | Muller | 252/430 |
| 4,284,578 | 8/1981 | De Lathauwer | 260/410.7 |
| 4,419,291 | 12/1983 | De Lathauwer | 260/410.7 |
| 4,447,462 | 5/1984 | Tafuri | 426/601 |
| 4,482,576 | 11/1984 | Boot | 426/603 |
| 5,133,902 | 7/1992 | Sankaran | 554/169 |

OTHER PUBLICATIONS

Swern 1979 Bailey's Industrial Oil & Fat Products vol. 1, 4th Edition pp. 424–434 John Wiley & sons New York.

Baileys Industrial Oil & Fat Products vol. 1 Fourth Ed. (Daniel Swern ed.) Wiley Interscience Publication New York 1979 pp. 315, 318, 323, 374–380.

*Primary Examiner*—Carolyn Paden
*Attorney, Agent, or Firm*—Kobbe, Martens, Olson & Bear, LLP

[57] ABSTRACT

An edible oil or fat improved in oxidative stability and suppressed in the development of off flavor is obtained without impairment of high physiological functions inherent to highly-unsaturated fatty acids. To obtain the edible oil or fat, a specific polyunsaturated fatty acid-base oil or a particular fat and saturated fatty acid-base oil or fat are mixed and subjected to an interesterification reaction so that fatty acids are caused to bond at random on glycerol skeletons of the oil or fat to achieve the following properties:

(a) the content of polyunsaturated fatty acids of at least three unsaturated bonds per molecule in fatty acid residual groups: 5 to 30%, (b) the content of saturated fatty acids free of any unsaturated bond: 50 to 80%, (c) iodine value: at least 35, and (d) melting point: 35° C. or higher.

6 Claims, 1 Drawing Sheet

EDIBLE OIL OR FAT AND EDIBLE OIL OR FAT MIXTURE

BACKGROUND OF THE INVENTION

1) Field of the Invention

This invention provides an edible oil or fat having various physiological functions and also a high nutritive value owing to its high oxidative stability and reduced off flavor despite inclusion of fatty acid having 3 or more unsaturated bonds (C=C). The edible oil or fat according to this invention can be used widely in the fields of foods such as general foods, designer foods, infant formulas and high-nutrient drinks.

2) Description of the Related Art

Among natural oils and fats existing in the natural world, fish oils, soybean oil, "Shiso" (*Perilla frutescens* Britton var. acuta Kudo) seed oil and the like can be mentioned as oils containing polyunsaturated fatty acids. These oils are however poor in oxidative stability because their saturated fatty acid concentrations are 5–35%. Oxidation or quality change of an oil or fat is a cause for deteriorations in flavor and nutrients. Although oils or fats rich in a polyunsaturated fatty acid such as DHA (decosahexaenoic acid) have many physiological functions such as development of the functions of the brain and nerve system, reducing action of allergies and anticancer action, they are well known to have low utility when applied as they are because their oxidation or quality change results in substantial changes in their properties and also in production of a off flavor or unpleasant offensive odor. Addition of hydrogen (hydrogenation) has been conducted for many years to enhance the oxidative stability of these oils or fats which contain a polyunsaturated fatty acid. Although hydrogenation varies depending on the reaction conditions, the polyunsaturated fatty acid is saturated by the hydrogenation so that the stability is improved. This however means elimination of the polyunsaturated fatty acid, thereby losing the function inherent to the polyunsaturated fatty acid.

For the prevention of a change in the quality of an oil or fat rich in a polyunsaturated fatty acid such as a fish oil in general, it is therefore widely adopted to use an antioxidant or a masking agent (Japanese Patent Laid-Open No. HEI 208390/1990, Japanese Patent Laid-Open No. 55785/1990, Japanese Patent Laid-Open No. 130042/1991). It is however difficult to store an oil or fat rich in a polyunsaturated fatty acid such as DHA over a long time without oxidation or a quality change by relying upon the above technique alone. Even if oxidation (the term "oxidation" as used herein means a quality change due to autoxidation of an oil or fat in broad sense and primarily denotes a quality change triggered by oxidation of methylene groups) can be inhibited to some extent, it is still impossible to prevent off flavor (which is caused by the autoxidation and formation of unsaturated aldehydes, ketones and nitrogen-containing compounds of the oil or fat and is considered attributable to the formation of unsaturated aldehydes). It has hence been impossible as a practical technique to add an oil or fat, which has been obtained by such a technique alone, to foods for which evaluation is important not only from the stand-points of functions and nutrients but also from the standpoint of organoleptic aspects, in particular, flavor. No method has therefore been realized yet for the effective antioxidation of an oil or fat containing a polyunsaturated fatty acid and having physiological effects or for the effective inhibition of off flavor of such an oil or fat.

As a typical method for modifying the chemical structure of an oil or fat, on the other hand, there is an interesterification reaction. The target, manner and the like of the interesterification however vary extremely widely depending on the desired oil or fat, so that effects of an interesterification cannot be predicted easily. Known interesterification include, for example, a process for the production of a liquid oil, in which to remove an undesired odor of palm oil, not more than 50% of a soft oil obtained by fractionation of palm oil is mixed with a liquid oil such as soybean oil, rapeseed oil, rice oil, peanut oil or cottonseed oil and the resulting mixture is subjected to interesterification, followed by deodorization (Japanese Patent Laid-Open No. 107304/1974); a process for the production of a mixture by subjecting 20–80 parts by weight of an oil rich in linoleic acid residual groups and 80–20 parts by weight of an oil rich in lauric acid residual groups to randomization so that the dilatation value of a margarine or the like is lowered (Japanese Patent Publication No. 42456/1990); a process for the prevention of crystallization of a margarine, which comprises randomizing 5–65% of palm oil together with one or more fats containing a $C_{44}$ or higher triglyceride as a principal component (Japanese Patent Publication No. 41218/1982); and a process for the provision of an oil which is free from foaming upon frying and has high thermal stability, which comprises subjecting to an interesterification reaction a mixture of 90–40 parts by weight of a lauric acid-base oil or fat and 10–60 parts by weight of an oleic acid-base oil or fat or a hydrogenated oil thereof. Since a difference in the target to be subjected to an interesterification leads to an oil or fat different in properties, it is difficult to predict, without any actual test or study, whether an oil or fat of desired properties can be actually obtained or not.

Known techniques which make use of an interesterification from the viewpoint of nutritional physiology include inter alia a synthetic oil or fat containing a medium-chain fatty acid and a polyunsaturated fatty acid at random in the same molecule and obtained by randomization between the medium-chain fatty acid and the polyunsaturated fatty acid [Blackburn et al., "Metabolism", 133, 910 (1984)]; and a synthetic oil or fat containing a polyunsaturated fatty acid at the 2-position and a medium-chain fatty acid at the 1,3-positions of a triglyceride and obtained by a selective interesterification between the medium-chain fatty acid and the polyunsaturated fatty acid, and a transfusion or enteral nutrient containing the synthetic oil or fat (Japanese Patent Laid-Open No. 297342/1988). According to these techniques, a medium-chain fatty acid excellent in digestion and absorption and a polyunsaturated fatty acid having various physiological functions are incorporated in the same molecule with a view toward providing an oil or fat having the nutritional physiological effects of both the fatty acids.

As has been described above, it has been conducted for many years to improve physical properties and nutritional functions of an oil or fat by changing the composition of fatty acids in a triglyceride. No study has however been made to provide an oil or fat improved in organoleptic aspects, that is, enhanced in oxidative stability and reduced in off flavor while retaining the nutritional physiological functions of fatty acids.

SUMMARY OF THE INVENTION

An object of the present invention is to provide an edible oil or fat markedly improved in oxidative stability without impairment of high physiological functions inherent to a feed oil or fat and improved in organoleptic properties without combined use of an antioxidant or a masking agent.

The present inventors have found that the above object can be achieved by subjecting a base oil or fat consisting of polyunsaturated fatty acid residual groups in a specific proportion and a base oil or fat consisting of saturated fatty acid residual groups in a particular proportion to interesterification so that an oil or fat of a modified chemical structure is obtained with polyunsaturated fatty acid residual groups and saturated fatty acid residual groups contained in particular proportions and also with an iodine value and a melting point controlled to particular values.

The present inventors have also found that an edible oil or fat further enhanced in the above-described effects can be obtained by limiting polyunsaturated fatty acids and saturated fatty acids in the oil or fat to specific carbon numbers and further controlling the triglyceride composition of the oil or fat to a particular composition.

Another object of the present invention is to provide an oil or fat mixture improved in nutritional physiological or organoleptic aspect of its nutrient ingredients.

The present inventors have also found that this object can be attained by adding the edible oil or fat, which has been obtained by the above-described interesterification, to a feed oil or fat mixture.

In one aspect of the present invention, there is thus provided an edible oil or fat obtained by subjecting:

(A) Base oil or fat consisting of polyunsaturated fatty acid residual groups in a proportion of at least 20%, and (B) Base oil or fat consisting of saturated fatty acid residual groups in a proportion not greater than 5% of unsaturated fatty acid residual groups, to an interesterification reaction, and having the following properties:

(a) the content of polyunsaturated fatty acid residual groups (n≧3): 5 to 30%, (b) the content of saturated fatty acid residual groups: 50 to 80%, (c) iodine value: at least 35, and (d) melting point: 35° C. or higher.

By changing the glyceride composition of the edible oil or fat as described above, it is possible to markedly improve the oxidative stability without impairment of high physiological functions inherent to a feed oil or fat and further to improve the organoleptic properties without combined use of an antioxidant or a masking agent or by adding it in a reduced amount. In other words, the specific change in the glyceride composition has made it possible to achieve very effectively not only higher oxidative stability compared with an oil or fat mixture equivalent thereto in terms of the fatty acid composition but also inhibition of off flavor which has not attracted any interests in the conventional art.

Preferably, polyunsaturated fatty acids whose carbon numbers range from 16 to 22 account for at least 90% of the polyunsaturated fatty acids in the edible oil or fat, and saturated fatty acids whose carbon numbers range from 16 to 22 account for at least 90% of the saturated fatty acids in the edible oil or fat. It may also be desired that the triglyceride composition of the edible oil or fat comprises not greater than 30% of tri-saturated triglycerides, at least 55% of di-saturated/mono-unsaturated triglycerides, not greater than 14% of mono-saturated/di-unsaturated tri-glycerides, and not greater than 1% of tri-unsaturated glycerides, and at least 20% of unsaturated fatty acids of the di-also that saturated/mono-unsaturated and mono-saturated/di-unsaturated triglycerides are polyunsaturated fatty acids. By limiting the triglyceride composition of the oil or fat to the above-described composition, the advantageous effects described above can be enhanced further.

In another aspect of the present invention, there is also provided an edible oil or fat mixture comprising the above-described edible oil or fat in a proportion of at least 20% based on the whole edible oil or fat.

The above edible oil or fat has high oxidative stability and is prevented from undergoing off flavor. Accordingly, it is not only excellent from the stand-point of nutritional physiology but also superb in organoleptic aspects, and is usable widely in general foods, special-purpose foods, powdered infant milk, nutrient compositions, therapeutic diets and the like.

DETAILED DESCRIPTION OF THE INVENTION AND PREFERRED EMBODIMENTS

Figure 1:
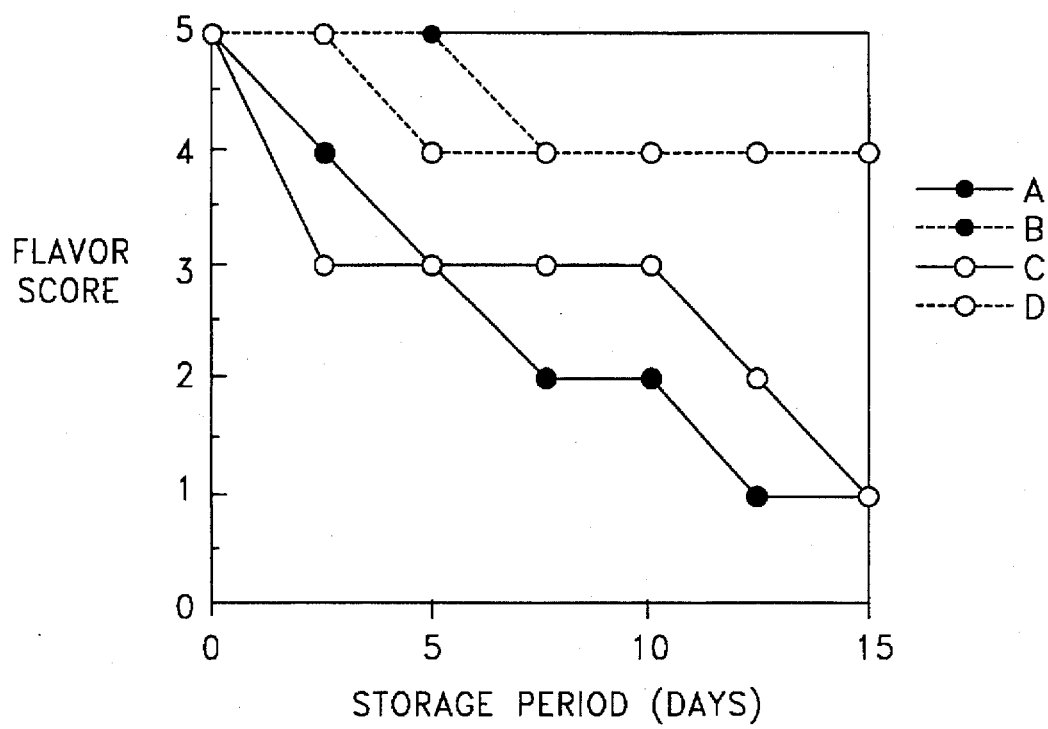
FIG. 1 diagrammatically illustrates time-dependent variations in offensive odor ranking ascertained by comparing randomized oils, which had been obtained in Examples 1 and 2 of the present invention, respectively, with mere mixtures of their respective raw materials, in which flavor scores and storage periods (days) are plotted along the ordinate and the abscissa, respectively, and the letters, A, B, C and D, are defined in Examples 1 and 2.

As a method for improving properties of an oil or fat without elimination of polyunsaturated bonds, a technique is known in which a mixture of plural oils or fats or a mixture of a fatty acid or an oil or fat and an alcohol are subjected to interesterification to obtain an interesterified oil or fat. Even when a mixture of two kinds of oils or fats or a mixture of an fatty acid or an oil or fat and an alcohol is subjected to interesterification, properties of the resulting oil or fat are not mere arithmetic averages of the corresponding properties of the raw materials. It is therefore practically impossible to predict properties of an interesterified oil or fat from those of its raw materials. The present inventors have however found that formation of an oil or fat as described in the claims makes it possible to provide an oil or fat inhibited in off flavor while retaining the physiological effects of polyunsaturated fatty acids and also the oxidative stability of saturated fatty acids, leading to the completion of the present invention.

The edible oil or fat according to this invention contains, as fatty acid residual groups in the oil or fat, 5–30%, preferably 10–25% of polyunsaturated fatty acids of at least three double bonds (C=C) and 50–80%, preferably 55–75% of saturated fatty acids free of a double bond. A lower content of polyunsaturated fatty acid residual groups leads to a reduction in the physiological activities inherent to the polyunsaturated fatty acids. An unduly small content of saturated fatty acid residual groups results in a difficulty in developing an oxidative stability enhancing effect and an off flavor inhibiting effect of the saturated fatty acids. Further, the melting point of the resultant interesterified oil or fat is generally 35° C. or higher. This is lower by 5° C. or more compared with the melting point of a mere mixed oil or fat obtained according to a commercial technique, that is, by using feed oils or fats derived from natural products and available on the market, namely, by mixing two or more oils or fats to have the fatty acid composition specified above. This is considered attributable to a triglyceride composition different from that of the mixed oil or fat so that a saturated fatty acid residual group and a polyunsaturated fatty acid residual group are contained in the same molecule and such triglyceride molecules are contained in a substantial quantity in the oil or fat. Further, these edible oils or fats have an iodine value of 35 or greater, and contain solid fats in a much smaller proportion than mixed oils or fats. The melting point and iodine value ranges differ depending on the kinds of oils or fats employed as raw materials. Since a high melting point and a high iodine value are mutually-contradictory properties, limitations are practically imposed on the upper limits of the melting point and the iodine value as long as natural products are used as the raw materials, that is, the base oil or fat consisting of polyunsaturated fatty acid residual groups and the base oil or fat consisting of saturated fatty acid residual groups, respectively. Approximately, the melting point is in a range of 35°–75° C. and the iodine value is in a range of 35–100. Their preferred ranges are about 50°–65° C. and 50–80, respectively. Owing to these limitations, the technique of the present invention can very effectively harmonize the functions of the polyunsaturated fatty acids with those of the saturated fatty acids, thereby bringing about advantageous effects. In particular, the present invention can effectively achieve not only higher oxidative stability compared with that of a mixed oil or fat equivalent in the composition of fatty acids but also the inhibition of off flavor which has not been overcome in the conventional art.

The limitations recited in claim 1 may appear insufficient at first glance. It will however be readily understood that they are necessary and sufficient in the present field of art where natural products are employed as raw materials. Although the flavor, especially the off flavor of an oil or fat is not totally irrelevant to its POV value, the off flavor is strongly affected by the level of flavor components inherently contained in the oil or fat. Keeping step with the progress of oxidation, the effects of these flavor components progressively come to the surface in a synergistic manner. An increase in the POV value is however known to indicate a progress in the development of off flavor.

In the edible oil or fat described above, polyunsaturated fatty acids whose carbon numbers preferably range from 16 to 22, with a range of 18–22 being particularly preferred, can account for at least 90% of the polyunsaturated fatty acids, and unsaturated fatty acids whose carbon numbers preferably range from 16 to 22, with a range of 18–22 being especially preferred, can account for at least 90% of the saturated fatty acids.

The oil or fat so obtained may preferably comprise not greater than 30%, especially 0–15% of tri-saturated triglycerides, at least 55%, notably 60–90% of di-saturated/mono-unsaturated triglycerides, not greater than 14%, particularly 1–5% of mono-saturated/di-unsaturated triglycerides, and not greater than 1%, specifically 0–0.5% of tri-unsaturated glycerides, and at least 20%, preferably 25–50% of unsaturated fatty acids of the di-saturated/mono-unsaturated and mono-saturated/di-unsaturated triglycerides may be polyunsaturated fatty acids. By controlling the triglyceride composition of the resulting oil or fat to the above-described composition, the above-described advantageous effects can be enhanced further. A change in the triglyceride composition makes it impossible to obtain expected effects at all or conversely, to bring about unexpected effects even if the fatty acid composition remains unchanged as a whole. Under the current circumstances, it is therefore generally almost impossible to predict properties of an edible oil or fat from those of feed oils or fats. The above limitation to the triglyceride composition render the above-described advantageous effects more paramount.

As the present invention has a room to choose various feed oils or fats in the light of properties and the like of an intended product and then to subject them to an interesterification reaction for the provision of the intended product. The edible oil or fat available in accordance with the present invention is therefore characterized in that advantageous properties of the feed oils or fats are derived to provide excellent properties as a whole. It is therefore possible to effectively combine an oil or fat, which contains polyunsaturated fatty acid residual groups having high physiological activities, with an oil or fat containing saturated fatty acid residual groups having high oxidative stability.

Each edible oil or fat available in accordance with the present invention can also be produced by an interesterification reaction of triglycerides themselves. The production of the edible oil or fat according to the present invention is however not limited to such interesterification reactions, but the edible oil or fat can also be obtained by a reaction between a triglyceride and a fatty acid or between a triglyceride and an alcohol, for example, by acidolysis or alcoholysis. Namely, the edible oil or fat according to the present invention is an edible oil or fat in which the corresponding fatty acid is bonded at random on the carbon sites of the glycerol skeleton of the oil or fat.

A detailed description will hereinafter be made of an interesterification which is most effective for the production of the edible oil or fat according to this invention. The oils or fats employed as raw materials for the provision of the edible oil or fat according to this invention are a polyunsaturated fatty acid base oil or fat containing polyunsaturated fatty acid residual groups in a proportion of at least 20% and a saturated fatty acid base oil or fat containing unsaturated fatty acid residual groups in a proportion not greater than 5%. No particular limitation is imposed on the polyunsaturated fatty acid base oil or fat as long as it is an oil or fat containing polyunsaturated fatty acid residual groups in an proportion of at least 20%. It is however preferred to select a base oil or fat consisting of polyunsaturated fatty acid residual groups, having beneficial physiological activities and tending to give off a characteristic unpleasant odor as oxidation or deterioration proceeds. Although the melting point of the base oil or fat consisting of polyunsaturated fatty acid residual groups does not appear as a sharp peak because this oil or fat is a mixture of plural kinds of glycerides, its melting point is relatively low, generally 20° C. or lower and its iodine value is 120 or greater.

Illustrative polyunsaturated fatty acids include linoleic acid, arachidonic acid, eicosapentaenoic acid (EPA) and docosahexanoic acid (DHA), with higher fatty acids of $C_{18}$ or more being preferred. Especially, a triglyceride mixture containing an ω-3 series fatty acid such as EPA or DHA is preferred as a raw material because such an series ω-3 series fatty acid has effective physiological activities such as thrombosis preventing action and anti-allergic action. On the other hand, a off flavor is considered to primarily comprise unsaturated aldehydes and the like formed by autoxidation of polyunsaturated fatty acids such as linoleic acid. As sources for a off flavor, polyunsaturated fatty acids (n=3 or greater) rich in tri or polyenoic acids are more troublesome than monoenoic acids (n=1) such as oleic acid and dienoic acids (n=2) such as linoleic acid. To use the above-described polyunsaturated fatty acid, it is therefore necessary to overcome the problem of its strong off flavor while retaining its merit of high physiological active effects. Therefore, the present invention uses a base oil or fat consisting of polyunsaturated fatty acid residual groups which contain polyunsaturated fatty acid residual groups, especially triene or polyene fatty acid residual groups in a proportion of at least 20%. Preferably, the polyunsaturated fatty acid contains polyunsaturated fatty acid residual groups in a proportion of at least 25%, more preferably at least 30%. Further, the preferred melting point is 15° C. or lower and the preferred iodine value is 150–250 or so. These limitations add further importance to the edible oil or fat of the present invention. An oil or fat in which the proportion of polyunsaturated fatty acid residual groups is less than 20% is not expected to effectively impart physiological activities too much and its off flavor does not become very troublesome. There is hence not much significance in practicing the present invention on such an oil or fat. Incidentally, the proportion of fatty acid residual groups in the present invention is expressed in terms of percentage based on the weight of all fatty acid residual groups.

As oil or fats containing polyunsaturated fatty acid residual groups in a proportion of at least 20%, fish oils are mentioned as representative examples and in addition, "Egoma" (*Perilla frutescens* Britton var. Japonica Hara) seed oil and the like can also be mentioned. It is generally possible to use an oil or fat which is active from the standpoint of nutritional physiology but is inferior in oxidative stability and undergoes off flavor. Irrespective of the origin or source of the oil or fat, an oil or fat in which the content of tri or polyenoic acid residual groups has been increased by fractionation or another method can also be employed. In particular, the effects of the present invention can be exhibited to substantial extent when the present invention is applied to fish oils, because fish oils contain useful fatty acids such as EPA and DHA at relatively high concentrations but are accompanied by the problems that an odor specific to them tends to remain and off flavor tends to occur even if the degree of purification is increased.

On the other hand, the base oil or fat consisting of saturated fatty acid residual groups can be an oil or fat substantially or absolutely free of polyunsaturated fatty acid residual groups or an oil or fat in which the content of unsaturated fatty acid residual groups has been reduced to 5% or below, in other words, an oil or fat in which the content of saturated fatty acid residual groups has been increased to a level of 95% or higher. A hydrogenated oil or fat can be used suitably. Although the melting point of the oil or fat does not appear as a sharp peak because it is a mixture of plural kinds of glycerides, its melting point is rather high, i.e., 50° C. or higher and its iodine value is 5 or smaller, preferably 1 or smaller. Saturated fatty acids are primarily higher saturated fatty acids such as palmitic acid and stearic acid. The above-described base oil or fat consisting of saturated fatty acid residual groups can exhibit a marked oxidative stability enhancing effect and an off flavor preventing effect when its glyceride composition is changed through randomization with the above-described base oil or fat consisting of polyunsaturated fatty acid residual groups. Base oil or fat consisting of saturated fatty acid residual groups in which the content of unsaturated fatty acid residual groups results in an oil or fat having lower oxidative stability and higher tendency of off flavor subsequent to an interesterification reaction. Preferably, the content of unsaturated fatty acid residual groups is 3% or lower, in other words, the content of saturate fatty acid residual groups is 97% or higher. Further, the preferred melting point and iodine value are about 60°–80° C. and about 0–5, respectively.

Illustrative examples of the saturated fatty acid base oil or fat include palm oil, lard, soybean oil, rapeseed oil and fish oils as well as oils or fats obtained by hydrogenation of fractionation products of such oils and containing saturated fatty acids at a higher concentration. In particular, hydrogenated rapeseed oil and hydrogenated soybean oil can be used suitably although not wishing to be limited thereto. Further, oils or fats in each of which the content of saturated fatty acids has been increased by full hydrogenation or the like can also be used.

The randomization between the base oil or fat consisting of polyunsaturated fatty acid residual groups and the base oil or fat consisting of saturated fatty acid residual groups, both described above, can be conducted conveniently by mixing 25–45 parts by weight, preferably 30–40 parts by weight of the base oil or fat consisting of polyunsaturated fatty acid residual groups with 50–80 parts by weight, preferably 55–75 parts by weight of the base oil or fat consisting of saturated fatty acid residual groups. If the proportion of the base oil or fat consisting of saturated fatty acid residual groups is too small, it then becomes difficult to exhibit its oxidative stability enhancing effect and off flavor inhibiting effect. As such an unduly small proportion of the base oil or fat consisting of saturated fatty acid residual groups may conversely lower the oxidative stability in some instances, there is a potential problem if the resulting oil or fat is employed especially as a material for foods for which an organoleptic evaluation is important. Even if the proportion of the base oil or fat consisting of saturated fatty acid residual groups is too high, on the other hand, its oxidative stability enhancing effect and off flavor inhibiting effect are not improved significantly or, even if enhanced, the use of the base oil or fat consisting of saturated fatty acid residual groups in such an unduly high proportion leads to a substantial reduction in the content of polyunsaturated fatty acids, whereby nutritional physiological effects can no longer be expected.

It is not only the above-described random interesterification process that can provide the edible oil or fat according to the present invention. The edible oil or fat can also be obtained by acidolysis between an oil or fat and a fatty acid or by alcoholysis between an oil or fat and an alcohol. Upon conducting the production, it is necessary to adjust the composition of fatty acid residual groups in the oil or fat, the fatty acid and the alcohol as described above. As a further alternative, the edible oil or fat can also be obtained by preparing, for example, a halogenated aliphatic compound by an organic synthesis process and then subjecting the halogenated aliphatic compound to an addition reaction with a glycerol.

It is also possible to obtain the oil or fat by using a monoglycerol or diglycerol as a starting substance and applying the above-described procedures.

Moreover, the oil or fat can also be produced by an organic synthesis process other than the above-described interesterification reactions which include the acidolysis and alcoholysis in broad sense. Such an organic synthesis process is however not considered to be fully advantageous from the practical standpoint, because it has difficulty in conducting mass production and is considered to involve possible use of a catalyst or solvent not suited for use in foods.

As an interesterification process, a chemical interesterification process or an interesterification process making use of an enzyme reaction is generally employed. Since base oils or fats consisting of saturated fatty acid residual groups useful in the practice of the present invention generally have a high melting point, the process making use of the enzyme reaction is applicable only to a narrow range of base oils or fats consisting of saturated fatty acid residual groups and moreover, is disadvantageous in cost. It is therefore not advisable to use the process making use of the enzyme reaction. At present, a chemical interesterification process is therefore practical and suitable.

A chemical interesterification reaction can be conducted in a manner known per se in the art. For example using a sodium methoxide catalyst, a sodium hydroxide catalyst or the like as an interesterification catalyst in an amount of 0.2–10 wt. %, a base oil or fat consisting of polyunsaturated fatty acid residual groups and a base oil or fat consisting of saturated fatty acid residual groups are reacted under reduced pressure (1–10 torr) at about 40°–140° C., preferably 60°–80° C. for 15 minutes to 2 hours. The reaction product may be subjected to deacidification, decoloring and/or deodorization as needed. Here, the ratio of the base oil or fat consisting of polyunsaturated fatty acid residual groups to the base oil or fat consisting of saturated fatty acid residual groups is critical. When the base oil or fat consisting of polyunsaturated fatty acid residual groups and the base oil or fat consisting of saturated fatty acid residual groups are used at such a ratio as giving the content of polyunsaturated fatty acids and the content of saturated fatty acids described in claim 1, an extremely marked oxidative stabilizing effect and off flavor inhibiting effect can be exhibited.

Incidentally, deodorizing treatment can be practiced, for example, by holding the resultant oil or fat at 200°–250° C. and treating it under reduced pressure (2–10 torr) for about 30 minutes to 2 hours while blowing steam into the oil or fat.

The edible oil or fat obtained in accordance with the present invention has significantly high oxidative stability and is markedly inhibited from off flavor. This oil or fat can be added to 20 wt. % or more, or even 30 wt. % or more based on the whole oil or fat, followed by the use of the resulting oil or fat mixture in nutrient compositions composed of proteins, carbohydrates, vitamins and minerals as principal ingredients. No particular limitation is imposed on such nutrient compositions as long as they permit inclusion of an oil or fat. Further, the edible oil or fat or the edible oil or fat mixture according to the present invention can be applied irrespective of the form of each nutrient composition, namely, no matter whether the nutrient composition is a liquid, a solid or an emulsion. No particular limitation is imposed on the manner of its addition to the nutrient composition. No quantitative limitation is imposed so that the edible oil or fat or the edible oil or fat mixture according to the present invention can either entirely or partly substitute for a conventional oil or fat ingredient and can be added in an amount as needed depending on the object.

The present invention will hereinafter be described more specifically by the following examples.

EXAMPLE 1

Using as a feed oil a mixture consisting of 670 g of a hydrogenated rapeseed oil and 330 g of a purified bonito oil shown in Table 1, a sodium methoxide catalyst was added in an amount of 0.6 wt. %. The resulting mixture was subjected to randomization under reduced pressure (5 torr) at 83° C. for 30 minutes in a stirred reactor equipped with a jacket. After completion of the randomization, the randomization mixture was neutralized with a dilute aqueous solution of hydrochloric acid. After the thus-neutralized reaction mixture was washed with water, an oil portion was taken out, followed by deodorization in a steam distillation apparatus. The deodorization was conducted for 1 hour by holding the oil at 242° C. while blowing steam thereinto under reduced pressure. During the deodorization, the internal pressure of the steam distillation apparatus was 5 torr. As a result, an interesterified oil which was free of fish oil odor and had high clarity was obtained in an amount of 915 g. Properties of the interesterified oil are shown in Table 3.

TABLE 1

| | Feed Oils | |
|---|---|---|
| | Hydrogenated rapeseed oil | Purified bonito oil |
| Trienoic or polyenoic acid residual groups (%) | Below minimum limit of detection | 32 |
| Saturated fatty acid residual groups (%) | ≧99 | 28 |
| Iodine value | ≦3 | 180 |
| Melting point (°C.) | 69° C. | (liquid at 0° C.) |
| POV (meq/kg) | ≦0.1 | ≦0.1 |

EXAMPLE 2

Using as a feed oil a mixture consisting of 700 g of a hydrogenated soybean oil and 300 g of a purified bonito oil shown in Table 2, a sodium methoxide catalyst was added in an amount of 0.6 wt. %. The resulting mixture was subjected to randomization under reduced pressure (5 torr) at 85° C. for 30 minutes in a stirred reactor equipped with a jacket. After completion of the randomization, the randomization mixture was neutralized with a dilute aqueous solution of hydrochloric acid. After the thus-neutralized reaction mixture was washed with water, an oil portion was taken out, followed by deodorization in a steam distillation apparatus. The deodorization was conducted for 1 hour by holding the oil at 245° C. while blowing steam thereinto under reduced pressure. During the deodorization, the internal pressure of the steam distillation apparatus was 5 torr. As a result, an interesterified oil which was free of fish oil odor and had high clarity was obtained in an amount of 900 g. Properties of the interesterified oil are shown in Table 3.

TABLE 2

| | Feed Oils | |
|---|---|---|
| | Hydrogenated soybean oil | Purified bonito oil |
| Trienoic or polyenoic acid residual groups (%) | Below minimum limit of detection | 45 |
| Saturated fatty acid residual groups (%) | ≧98 | 20 |
| Iodine value | ≦3 | 200 |
| Melting point (°C.) | 68° C. | (liquid at 0° C.) |
| POV (meq/kg) | ≦0.1 | ≦0.1 |

TABLE 3

| | Interesterified Oils | |
|---|---|---|
| | Example 1 | Example 2 |
| Polyunsaturated fatty acids (n ≧ 3) (%) | 10.3 | 13.6 |
| Di-unsaturated fatty acids (n = 2) (%) | 3.0 | 2.0 |
| Mono-unsaturated fatty acids (n = 1) (%) | 10.5 | 6.5 |
| Saturated fatty acids (%) | 76.2 | 77.9 |
| Iodine value | 52.3 | 60.5 |
| Melting point (°C.) | 61.2 | 60.2 |
| POV (meq/kg) | ≦0.1 | ≦0.1 |

TABLE 3-continued

| Interesterified Oils | | |
|---|---|---|
| | Example 1 | Example 2 |
| Tri-saturated TGs* | ≦11% | ≦18% |
| Di-saturated/mono-unsaturated TGs | ≧77% | ≧65% |
| Mono-saturated/di-unsaturated TGs | ≦7% | ≦14% |
| Tri-unsaturated TGs | ≦0.1% | ≦0.1% |

(TG: Triglyceride)

Test 1

Figure 2:
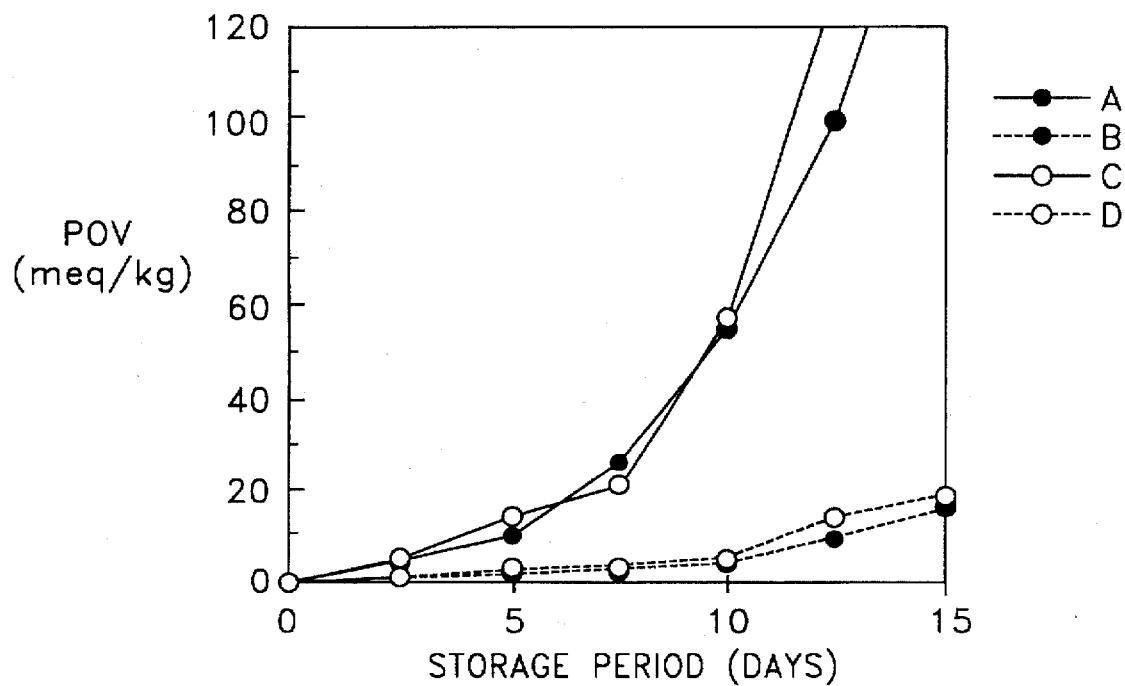
FIG. 2 diagrammatically shows time-dependent variations of POV ascertained by comparing the randomized oils, which had been obtained in Examples 1 and 2 of the present invention, respectively, with the mere mixtures of their respective raw materials, in which POVs (unit: meg/kg) and storage periods (days) are plotted along the ordinate and the abscissa, respectively, and the letters, A, B, C and D, are defined in the respective Examples.

Separately collected in 200 ml beakers were 100 g portions of the interesterified oils obtained above in Examples 1 and 2, said interesterified oils being indicated by letters B and D in FIGS. 1 and 2, and 100 g portions of mixed oils obtained by merely mixing the feed oils and then subjecting the mixtures to a deodorizing step as in the Examples without any interesterification, said mixed oils being indicated by letters A and C in FIGS. 1 and 2. The beakers with the interesterified oils and the mixed oils placed therein, respectively, were then stored in an oven which was controlled at 80° C. An organoleptic test of offensive odor was conducted by a panel consisting of 20 experts. Ranking of offensive odor was performed based on 5-stage ranking systems as shown in Table 4, and was indicated by an average of flavor scores given by the 20 experts. Further, the degree of oxidation was determined by measuring the POV. Flavor scores (off flavor) are shown in FIG. 1, while POVs are illustrated in FIG. 2.

It is evident from FIG. 1 that, as unsaturated fatty acid residual groups and saturated fatty acid residual groups has been subjected to randomization in each oil or fat according to the present invention, the oil or fat is much superior in oxidative stability and flavor score compared with an equivalent oil or fat mixture not subjected to randomization.

TABLE 4

| Flavor Score | |
|---|---|
| Score | Description |
| 5 | Good flavor was smelled. |
| 4 | Slight rancid odor was smelled. |
| 3 | Rancid odor was smelled undoubtedly. |
| 2 | Strong rancid odor was smelled. |
| 1 | Rancid odor was smelled along with irritating odor |

EXAMPLE 3 using as a feed oil a mixture consisting of 580 g of a hydrogenated rapeseed oil and 420 g of a purified tuna oil shown in Table 5, a sodium methoxide catalyst was added in an amount of 0.6 wt. %. The resulting mixture was subjected to randomization under reduced pressure (5 torr) at 83° C. for 30 minutes in a stirred reactor equipped with a jacket. After completion of the randomization, the randomization mixture was neutralized with a dilute aqueous solution of hydrochloric acid. After the thus-neutralized reaction mixture was washed with water, an oil portion was taken out, followed by deodorization in a steam distillation apparatus. The deodorization was conducted for 1 hour by holding the oil at 242° C. while blowing steam thereinto under reduced pressure. During the deodorization, the internal pressure of the steam distillation apparatus was 5 torr. As a result, an interesterified oil which was free of fish oil odor and had high clarity was obtained in an amount of 880 g. Properties of the interesterified oil are shown in Table 5.

TABLE 5

| | Feed Oils | |
|---|---|---|
| | Hydrogenated rapeseed oil | Purified tuna oil |
| Trienoic or polyenoic acid residual groups (%) | Below minimum limit of detection | 50 |
| Saturated fatty acid residual groups (%) | ≧99 | 12 |
| Iodine value | ≦3 | 220 |
| Melting point (°C.) | 69° C. | (liquid at 0° C.) |
| POV (meq/kg) | ≦0.1 | ≦0.1 |

EXAMPLE 4

Using as a feed oil a mixture consisting of 600 g of a hydrogenated soybean oil and 400 g of a purified sardine oil shown in Table 6, a sodium methoxide catalyst was added in an amount of 0.6 wt. %. The resulting mixture was subjected to randomization under reduced pressure (5 torr) at 85° C. for 30 minutes in a stirred reactor equipped with a jacket. After completion of the randomization, the randomization mixture was neutralized with a dilute aqueous solution of hydrochloric acid. After the thus-neutralized reaction mixture was washed with water, an oil portion was taken out, followed by deodorization in a steam distillation apparatus. The deodorization was conducted for 1 hour by holding the oil at 245° C. while blowing steam thereinto under reduced pressure. During the deodorization, the internal pressure of the steam distillation apparatus was 5 torr. As a result, an interesterified oil which was free of fish oil odor and had high clarity was obtained in an amount of 920 g. Properties of the interesterified oil are shown in Table 7.

TABLE 6

| | Feed Oils | |
|---|---|---|
| | Hydrogenated soybean oil | Purified sardine oil |
| Trienoic or polyenoic acid residual groups (%) | Below minimum limit of detection | 37 |
| Saturated fatty acid residual groups (%) | ≧98 | 25 |
| Iodine value | ≦3 | 165 |
| Melting point (°C.) | 68° C. | (liquid at 0° C.) |
| POV (meq/kg) | ≦0.1 | ≦0.1 |

TABLE 7

| Interesterified Oils | | |
|---|---|---|
| | Example 3 | Example 4 |
| Polyunsaturated fatty acids (n ≧ 3) (%) | 22.1 | 13.9 |
| Di-unsaturated fatty acids (n = 2) (%) | 5.2 | 1.3 |
| Mono-unsaturated fatty acids (n = 1) (%) | 8.6 | 11.0 |
| Saturated fatty acids (%) | 64.1 | 73.8 |
| Iodine value | 101.6 | 70.9 |
| Melting point (°C.) | 50.1 | 55.0 |

TABLE 7-continued

| | Interesterified Oils | |
|---|---|---|
| | Example 3 | Example 4 |
| POV (meq/kg) | ≦0.1 | ≦0.1 |
| Tri-saturated TGs | 7% | 10% |
| Di-saturated/mono-unsaturated TGs | 61% | 73% |
| Mono-saturated/di-unsaturated TGs | 31% | 16% |
| Tri-unsaturated TGs | 0.2% | 0.2% |

Test 2

Separately collected in 200 ml beakers were 100 g portions of the interesterified oils obtained above in Examples 1 to 4 and 100 g portions of mixed oils obtained by merely mixing the feed oils and then subjecting the mixtures to a deodorizing step as in the Examples without any interesterification, said mixed oils being to be referred to as "Controls" in Tables 8 and 9. The beakers with the interesterified oils and the mixed oils placed therein, respectively, were then stored in an oven which was controlled at 80° C. An organoleptic test of offensive odor was conducted by a panel consisting of 20 experts. Ranking of offensive odor was performed based on the 5-stage ranking systems as shown in Table 4, and was indicated by an average of flavor scores given by the 20 experts. The results are shown in Table 8. Further, the degree of oxidation was determined by measuring the POV. Results are shown in Table 9.

TABLE 8

| | Flavor Score | | | | | | | |
|---|---|---|---|---|---|---|---|---|
| Storage | Example 1 | | Example 2 | | Example 3 | | Example 4 | |
| period (days) | IEO* | Control | IEO | Control | IEO | Control | IEO | Control |
| 0 | 5 | 5 | 5 | 5 | 5 | 4 | 5 | 5 |
| 2.5 | 5 | 4 | 5 | 3 | 5 | 3 | 5 | 3 |
| 5 | 5 | 3 | 4 | 3 | 4 | 2 | 5 | 3 |
| 7.5 | 4 | 2 | 4 | 3 | 4 | 2 | 4 | 2 |
| 10 | 4 | 2 | 4 | 3 | 4 | 1 | 4 | 2 |
| 12.5 | 4 | 1 | 4 | 2 | 3 | 1 | 3 | 1 |
| 15 | 4 | 1 | 4 | 1 | 3 | 1 | 3 | 1 |

*IEO: Interesterified Oil

TABLE 9

| | POV | | | | | | | |
|---|---|---|---|---|---|---|---|---|
| Storage | Example 1 | | Example 2 | | Example 3 | | Example 4 | |
| period (days) | IEO* | Control | IEO | Control | IEO | Control | IEO | Control |
| 0 | 0.1 | 0.1 | 0.1 | 0.1 | 0.1 | 0.1 | 0.1 | 0.1 |
| 2.5 | 0.8 | 4.5 | 0.5 | 5.5 | 0.9 | 7.2 | 0.6 | 4.9 |
| 5 | 1.6 | 9.9 | 1.5 | 14.7 | 3.1 | 22.1 | 1.8 | 15.1 |
| 7.5 | 2.9 | 26.9 | 2.4 | 21.8 | 5.0 | 30.8 | 3.1 | 25.5 |
| 10 | 5.5 | 55.5 | 4.0 | 58.2 | 6.1 | 72.7 | 4.9 | 66.0 |
| 12.5 | 14.2 | 100.5 | 9.6 | 127.3 | 17.8 | 144.3 | 16.2 | 113.1 |
| 15 | 20.1 | 169.1 | 18.1 | 169.1 | 40.1 | 226.2 | 28.3 | 198.8 |

*IEO: Interesterified Oil

Test 3

A 4:1:2 mixture of fractionated palm kernel oil, palm oil and soybean oil was added in amounts of 80 g, 70 g, 60 g and 50 g to 20 g, 30 g, 40 g and 50 g portions of the edible interesterification oil obtained in Example 1, respectively, whereby four 100 g samples were prepared. A storage stability test was then conducted. Even 15 days later, their flavor scores were all 4 and their POVs were in a range of 2–10 meg/kg. When an equivalent oil mixture of the feed oils employed in Example 1 was employed without subjecting it to any random interesterification, the flavor scores of the resulting samples were all 1 and their POVs were in a range of 50–100 meg/kg.

As has been described above, it is possible to markedly improve the oxidative stability of an edible oil or fat without impairment of high physiological functions inherent to feed oils or fats and also to improve organoleptic properties without combined use of an antioxidant or a masking agent by limiting the contents of polyunsaturated fatty acids and saturated fatty acids in fatty acid residual groups to specific proportions and also specifying the iodine value and melting point of the edible oil or fat. Namely, a specific change in the glyceride composition has made it possible to very effectively achieve not only higher oxidative stability compared with an oil or fat mixture equivalent thereto in terms of the fatty acid composition but also inhibition of off flavor which has not attracted any interests in the conventional art.

In the above edible oil or fat, the above-described advantageous effects can be enhanced further by limiting the carbon numbers of polyunsaturated fatty acids and those of saturated fatty acids in the oil or fat to specific numbers and further controlling the triglyceride composition of the oil or fat to a particular composition.

Owing to the provision of the edible oil or fat through the interesterification between the specific base oil or fat consisting of saturated fatty acid residual groups and the particular base oil consisting of polyunsaturated fatty acid residual groups, it has now become possible to effectively derive the oxidative stability and organoleptic properties of the base oil or fat consisting of saturated fatty acid residual groups, which is excellent particularly in oxidative stability, without impairing high physiological functions of the base oil or fat consisting of polyunsaturated fatty acid residual groups, which has the excellent functions from the standpoint of nutritional physiology but is poor especially in oxidative stability and involves off flavor as a potential problem.

The above edible oil or fat has high oxidative stability and is prevented from undergoing off flavor. Accordingly, nutrient compositions obtained by adding an oil or fat mixture which contains the edible oil or fat are not only excellent from the standpoint of nutritional physiology but also superb in organoleptic aspects, and are usable widely in general foods, special-purpose foods, powdered infant milk, etc.

We claim:

1. An interesterified edible oil or fat obtained by interesterification of:

(A) polyunsaturated fatty acid base oil or fat containing polyunsaturated fatty acid residual groups (n≧3) in a proportion of at least 20 wt. %; and (B) saturated fatty acid base oil or fat containing polyunsaturated fatty acid residual groups in a proportion of not greater than 5 wt. %, said interesterified edible oil or fat comprising:

(a) 5%–30% of polyunsaturated fatty acid residual groups (n≧3); and (b) 50%–80% of saturated fatty acid residual groups, both based on the weight of the fatty acid residual groups;

and having the following properties:

(c) iodine value: at least 35, (d) melting point: 35° C. or higher, and (e) peroxide value (POV) as measured when initial POV≦0.1 meg/kg and when stored at 80° C. for 15 days: 1/5 to 1/10 of equivalent oil mixture's POV.

2. The interesterified edible oil or fat according to claim 1, wherein at least 90% of said polyunsaturated fatty acid residual groups are composed of those having a carbon number of 16 to 22, and at least 90% of said saturated fatty acid residual groups are composed of those having a carbon number of 16 to 22.

3. The interesterified edible oil or fat according to claim 1 or 2, wherein the triglyceride composition of said edible oil or fat comprises:

not greater than 30% of trisaturated triglycerides;

at least 55% of di-saturated/mono-unsaturated triglycerides;

not greater than 14% of mono-saturated/di-unsaturated triglycerides; and not greater than 1% of tri-unsaturated glycerides, wherein at least 20% of the unsaturated fatty acid residual groups of said di-saturated/mono-unsaturated and mono-saturated/di-unsaturated triglycerides are polyunsaturated fatty acid residual groups.

4. An edible oil or fat mixture comprising an edible oil or fat in a proportion of at least 20 wt. % based on the whole edible oil or fat, said edible oil or fat being interesterified oil or fat obtained by interesterification of:

(A) polyunsaturated fatty acid base oil or fat containing polyunsaturated fatty acid residual groups (n≧3) in a proportion of at least 20 wt. %; and (B) saturated fatty acid base oil or fat containing polyunsaturated fatty acid residual groups in a proportion of not greater than 5 wt. %, and comprising:

(a) 5%–30% of polyunsaturated fatty acid residual groups (n≧3); and (b) 50%–80% of saturated fatty acid residual groups, both based on the weight of the fatty acid residual groups;

and having the following properties:

(c) iodine value: at least 35;

(d) melting point: 35° C. or higher, and (e) POV as measured when initial POV≦0.1 meg/kg and when stored at 80° C. for 15 days: 1/5 to 1/10 of equivalent oil mixture's POV.

5. The edible oil or fat mixture according to claim 4, wherein at least 90% of said polyunsaturated fatty acid residual groups in said interesterified edible oil or fat are composed of those having a carbon number of 16 to 22, and at least 90% of said saturated fatty acid residual groups in said interesterified edible oil or fat are composed of those having a carbon number of 16 to 22.

6. The edible oil or fat mixture according to claim 4 or 5, wherein the triglyceride composition of said interesterified edible oil or fat comprises:

not greater than 30% of trisaturated triglycerides;

at least 55% of di-saturated/mono-unsaturated triglycerides;

not greater than 14% of mono-saturated/di-unsaturated triglycerides; and not greater than 1% of tri-unsaturated glycerides, wherein at least 20% of the unsaturated fatty acid residual groups of said di-saturated/mono-unsaturated and mono-saturated/di-unsaturated triglycerides are polyunsaturated fatty acid residual groups.

* * * * *